United States Patent
Syse et al.

(10) Patent No.: US 7,568,504 B2
(45) Date of Patent: Aug. 4, 2009

(54) HYDRAULIC CYLINDERS AND PLUG WITH HYDRAULIC CYLINDER

(75) Inventors: Harald Syse, Røyneberg (NO); Jostein Aleksandersen, Randaberg (NO)

(73) Assignee: TDW Offshore Services AS, Stavanger (NO)

( * ) Notice: Subject to any disclaimer, the term of this patent is extended or adjusted under 35 U.S.C. 154(b) by 468 days.

(21) Appl. No.: 10/531,739

(22) PCT Filed: Dec. 6, 2004

(86) PCT No.: PCT/NO2004/000375

§ 371 (c)(1),
(2), (4) Date: May 23, 2005

(87) PCT Pub. No.: WO2005/054738

PCT Pub. Date: Jun. 16, 2005

(65) Prior Publication Data
US 2006/0086086 A1 Apr. 27, 2006

(30) Foreign Application Priority Data
Dec. 5, 2003 (NO) .................................. 20035443

(51) Int. Cl.
*F16L 55/04* (2006.01)
(52) U.S. Cl. .............................. 138/31; 138/30; 60/473
(58) Field of Classification Search .................. 138/89, 138/90; 60/473, 474, 476
See application file for complete search history.

(56) References Cited

U.S. PATENT DOCUMENTS

| | | | | |
|---|---|---|---|---|
| 3,115,186 A | * | 12/1963 | Kline | 166/135 |
| 3,633,668 A | * | 1/1972 | Vazquez et al. | 166/135 |
| 3,978,678 A | * | 9/1976 | Duncan et al. | 405/171 |
| 4,352,394 A | * | 10/1982 | Zehren | 166/106 |
| 4,405,017 A | * | 9/1983 | Allen et al. | 166/382 |
| 4,854,384 A | * | 8/1989 | Campbell | 166/122 |
| 4,991,651 A | * | 2/1991 | Campbell | 166/122 |
| 5,024,270 A | * | 6/1991 | Bostick | 166/63 |
| 5,029,614 A | * | 7/1991 | Lara et al. | 138/90 |
| 5,255,294 A | * | 10/1993 | Bierwirth | 376/204 |
| 5,924,454 A | * | 7/1999 | Dyck et al. | 138/89 |
| 6,241,424 B1 | * | 6/2001 | Bath et al. | 405/156 |
| 6,282,893 B1 | | 9/2001 | Porter et al. | |
| 7,124,779 B2 | * | 10/2006 | Syse | 138/89 |

FOREIGN PATENT DOCUMENTS

| | | |
|---|---|---|
| EP | 1158181 | 11/2001 |
| GB | 2203214 | 10/1988 |
| JP | 08105407 | 4/1996 |
| WO | WO 03/067134 | 8/2003 |

* cited by examiner

*Primary Examiner*—Patrick F Brinson
(74) *Attorney, Agent, or Firm*—Gable Gotwals

(57) ABSTRACT

The invention regards a hydraulic cylinder (1) or a plug comprising a hydraulic cylinder for operation of anchoring and or sealing devices, where the hydraulic cylinder comprising a cylinder chamber (6), a piston head (4) within said cylinder chamber (6) forming two sub chambers (7, 7') of said cylinder chamber (6) one on each side of the piston head (4), and a piston rod (5) which runs through the piston head (4) and said two sub chambers (7, 7') or only one of said cub chambers. The hydraulic power unit (8) for operation of the hydraulic cylinder (1) is situated at least partly within the parts forming the hydraulic cylinder (1) itself, preferably the piston head (4) and or the piston rod (5).

6 Claims, 2 Drawing Sheets

HYDRAULIC CYLINDERS AND PLUG WITH HYDRAULIC CYLINDER

Figure 1:
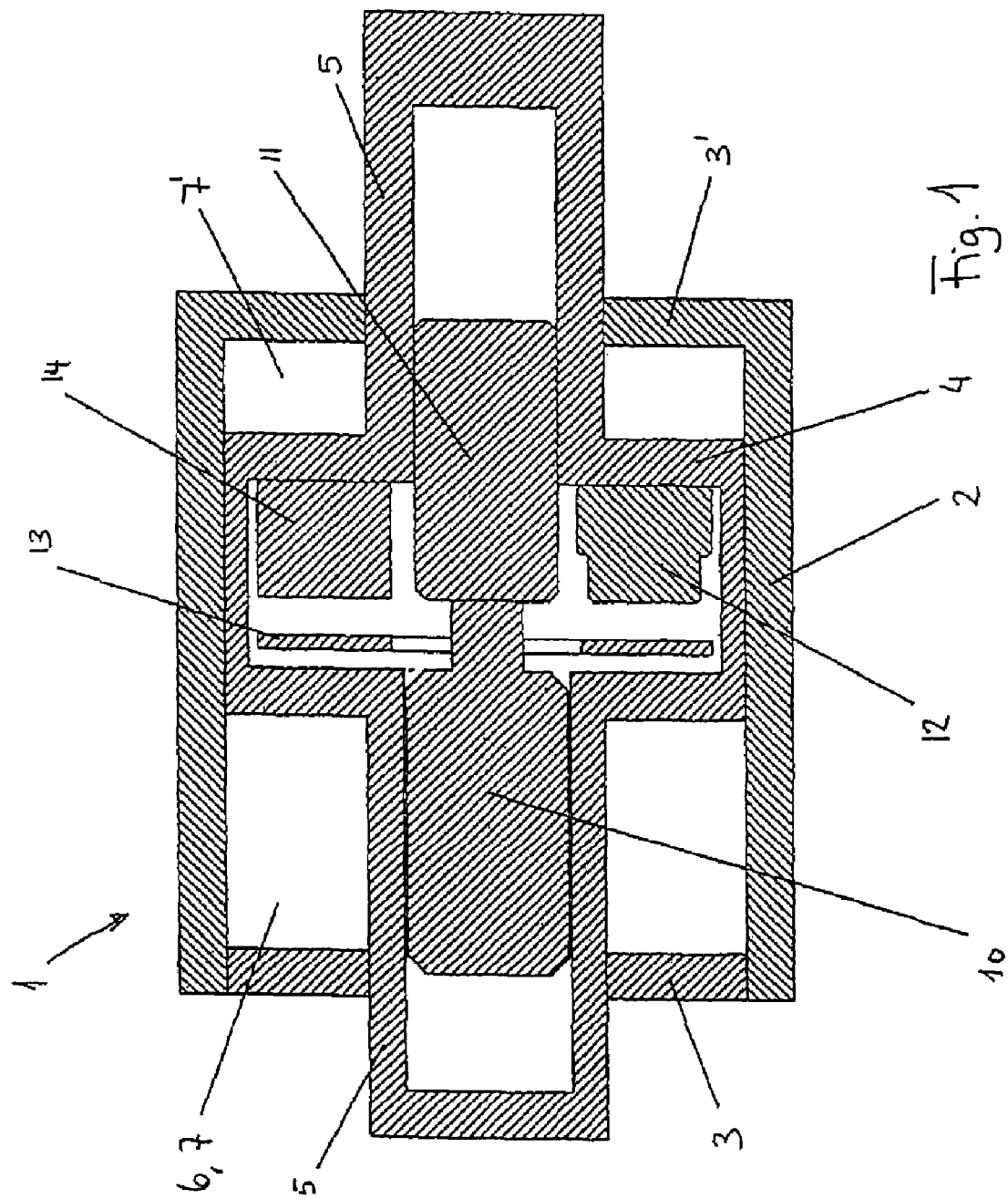

The present invention regards hydraulic cylinders and a plug with a hydraulic cylinder for sealing off a pipeline. By hydraulic cylinder it is in this patent application meant a cylinder with endplates, a piston head and piston rod, which piston head is moved within the cylinder by adding and or removing fluid from one or both sides of the piston head, and the piston rod is connected to the piston head.

When using a hydraulic cylinder there is a need for feeding pressurized fluid into one or both sides of the piston head. In the most commonly used pistons there is a piston rod running from one side of the piston head and out of the piston chamber wherein the piston head is situated. This creates the problem of different volumes on the two sides of the piston head and therefore the need for an accumulator tank for the hydraulic fluid to compensate for the differences in volumes on the two sides of the piston head when it is moved within the piston chamber. This tank for the hydraulic fluid and also control devised for operation of the hydraulic cylinder, as pumps, valves, transmitters etc. constitutes a need for additional space in addition to the hydraulic cylinder itself.

In NO application 20023100 there is described a piston in relation with a plug for closing off pipelines, where the piston rod runs through the piston head and the whole chamber, in other words through both sub chambers, one on each side of the piston head. This means equal volume changes on both sides of the piston head, when it is moved within the piston chamber. This solution eliminates or at least reduces the volume of an accumulator tank for the hydraulic fluid to a minimum.

However, both these solutions must normally be equipped with power units and control lines to the outside of the hydraulic piston for operation of the hydraulic cylinder and in the first example there also have to be an accumulation tank and fluid lines running into the hydraulic cylinder's chambers.

The lines for operation of the hydraulic cylinder hydraulic fluid lines and power lines etc. create several problems in use. In general it is a problem to get the connection between the lines and the hydraulic cylinder secure and there have to be several entries into the cylinder chamber to operate the piston. Further constitutes these lines and the other equipment for operating the hydraulic cylinder as a pump, circuit board, valves, batteries etc a need for additional space outside the hydraulic cylinder. When using a hydraulic cylinder in for instance a plug for closing off pipelines, the need for this additional space is a major drawback.

One object of the present invention is to provide a hydraulic cylinder which takes little space. With hydraulic cylinder it is as pervious stated meant a cylinder with endplates forming a cylinder chamber, a piston head within said chamber and a piston rod running from said piston head and hydraulic fluid for operation of the hydraulic cylinder, and this phrase is used for the rest of the application.

It is another object of the present invention to provide a hydraulic cylinder which is reliable and needs less maintenance than prior art hydraulic cylinders. It is also an object to provide a hydraulic cylinder without external hydraulic fluid lines.

Another object of the present invention is to provide a plug which has a wider range of use than other plugs, and a plug which is shorter in length and therefore also may be used in pipelines with sharper bends. It is also an object of the present invention to provide a plug without hydraulic lines running outside the plug.

A hydraulic cylinder and a plug wherein the above mentioned objects is achieved and the aforementioned drawbacks with prior art is improved, is obtained with a plug and a hydraulic cylinder according to the claims.

A plug with a hydraulic cylinder or a hydraulic cylinder according to the present invention comprises a cylinder with two endplates forming a cylinder chamber, a piston head within said cylinder chamber forming two sub chambers of said cylinder chamber, one on each side of the piston head, and a piston rod. The piston rod runs in the preferred embodiment through both sub chambers of said hydraulic cylinder. In another embodiment the piston rod runs from the piston head through only one of said sub cambers. There is at least hydraulic fluid on one side of said piston head in the cylinder chamber with fluid connections to a control system. The hydraulic cylinder is according to prior art equipped with sealing devices between movable parts, but these are not at part of the invention and will therefore not be explained further. A skilled person will be able to choose the appropriate and needed equipment to make the hydraulic cylinder work.

The hydraulic cylinder is operated by a control device, which controls a hydraulic power unit. In the present invention the control device and or the hydraulic power unit are situated at least partly within the parts forming the hydraulic cylinder itself.

By this is it meant that all or parts of the control devices and or hydraulic power unit may be situated in the cylinder, endplates, piston head and or piston rod.

There are several solutions which may be envisaged for placement of the different parts of the elements. A small accumulation tank for the hydraulic fluid may be placed in the cylinder wall and or an endplate. Another possibility is to have fluid lines, valves and pump situated within the piston head. Another possibility is to have fluid lines and valves in the piston head and motor and pump and possibly a tank fully or partly within the piston rod. One may also envisage that the motor is partly situated within the piston rod with cable lines running from the piston rod and to a battery pack outside the hydraulic cylinder or to an energy source outside the pipeline.

In an preferred embodiment of the invention the control device is operated remotely, and the remote controlling device and the hydraulic power unit, comprising at least motor, circuit board, vales, pressure transmitter, hydraulic pump, etc, for the hydraulic cylinder, is situated within the piston rod and or the piston head, where the larger elements as the motor and the hydraulic pump of the hydraulic power unit are positioned at least partly within the piston rod. The piston head comprises feed lines for hydraulic fluid from a first sub chamber, through said valves and said pump to a second sub chamber. By this one may operate the hydraulic cylinder by moving hydraulic fluid from one to the other sub chamber.

The hydraulic cylinder according to the invention may be a one-way or two-way operational hydraulic cylinder. The hydraulic cylinder may have a piston rod running through one or both of said sub chamber of the hydraulic cylinder. In a two way operational hydraulic cylinder is the hydraulic pump normally and preferably a two-way pump, instead of having two pumps which takes more space and the piston rod runs preferably through both sub-chambers to avoid the need for a large accumulation tank.

The preferred embodiment of the hydraulic cylinder gives a hydraulic cylinder which is small and with no externally running fluid lines. This means a hydraulic cylinder which is more reliable in that one has no danger of leakage in the connection of fluid lines to the hydraulic cylinder itself. However, one may envisage some control lines between the hydraulic cylinder and for instance an outside battery pack, especially in the case where the hydraulic cylinder is remotely operated.

The present invention also regards a plug for closing off a pipeline for a fluid flow. The plug comprises, as a normal plug, anchoring and sealing means for anchoring and sealing against the internal wall of the pipeline. These anchoring and sealing means may be an integrated unit or two different units with separate tasks and separate control device. However, the anchoring and sealing devices are operated by at least one hydraulic cylinder. There may be one hydraulic cylinder operating both anchoring and sealing devices and several hydraulic cylinders operating parts of the sealing or anchoring devices. The hydraulic cylinder according to the invention is operated by a hydraulic power unit and remote operation device which are situated at least partly within the hydraulic cylinder itself. There are here as mentioned above several possibilities which are within the scope of the invention as defined in the claims and which are within the range of a skilled person.

In a preferred embodiment the plug comprises anchoring and sealing devices operated by one common hydraulic cylinder, wherein the operation is achieved with a hydraulic power unit partly within the hydraulic cylinder itself preferably in the piston head and piston rod. In the preferred embodiment is the plug remotely operated, which means remote operation devices within the hydraulic cylinder as well. The plug may be operated by direct control lines to the outside of the pipeline, but in normal operation of the plug according to the invention is it used in pipelines with a length which makes direct operation not possible, so remote operation is a necessity.

Figure 2:
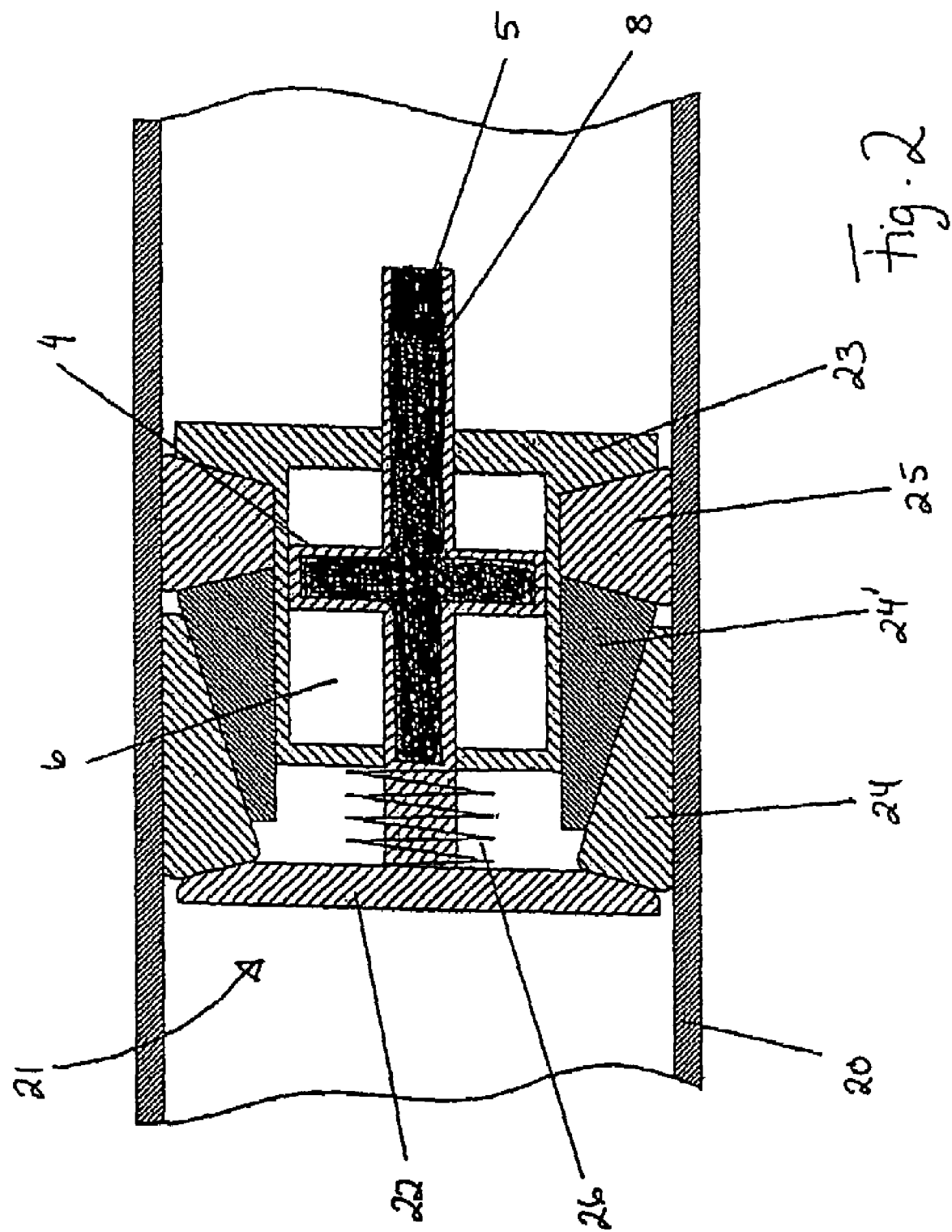

The present invention will now be explained with a preferred embodiment with references to the enclosed drawings, where:

FIG. 1 shows a preferred embodiment of a hydraulic cylinder according to the invention, FIG. 2 shows an embodiment of a plug according to the invention.

The hydraulic cylinder 1 according to the invention comprises as shown in FIG. 1 a cylinder 2 with two endplates 3, 3', which together forms a cylinder chamber 6, a piston head 4 and a piston rod 5. The cylinder 2 and one of the endplates 3' may as shown in the figure, be formed as one element. The hydraulic cylinder 1 has the piston head 4 within the cylinder chamber 6 and this forms two sub chambers 7, 7' one on each side of the piston head 4. The piston head 4 has according to the preferred embodiment as shown in the figures, a piston rod 5 running from the piston head 4 and out of the cylinder chamber 6, on both sides of the piston head 4, i.e. the piston rod runs through the whole cylinder chamber and out on both sides. The piston rod 5 and piston head 4 is in the preferred embodiment made in one piece. They may be formed by several elements.

As shown in FIG. 1 the hydraulic power unit for operating the hydraulic cylinder is situated within the element forming the piston rod 5 and piston head 4. The power unit comprises a pump 11, a motor 10 running the pump 11, a circuit board 13, power transmitters 14 and valves 12. All these elements are schematically shown in FIG. 1, and for instance fluid lines from one sub chamber through valves and pump to the other sub chamber is not shown for clarity. A skilled person will understand that there has to be one opening from one sub chamber 7 into the piston head 4 for a fluid line with closing valves 12 and pump 11 connected in this fluid line which runs to an opening in the piston head 4 facing the other sub chamber 7'. By running the pump 11 one or two ways the hydraulic cylinders piston head 4 may be moved one or two ways within the cylinder chamber 6.

As mentioned before the hydraulic cylinder may be of a kind without a through going piston rod 5. In that case must an accumulation tank for instance be place at least partly within the hydraulic cylinder, to accumulate the difference in volume changes between the two different sub-chambers. The accumulation tank may also according to the invention be place outside the hydraulic cylinder, while other parts of the hydraulic power unit is inwards the hydraulic cylinder, but this is not favourable.

One may also envisage that the pump may be situated partly outside the piston rod and that the motor running the pump or a battery patch for a motor is outside the hydraulic cylinder, for instance at one end of the piston rod. This still gives the benefit of no external hydraulic lines for the hydraulic cylinder.

As shown in FIG. 2, one use of the hydraulic cylinder 1 according to the invention, as described above, is in a plug 21. A plug 21 for closing off a pipeline 20 comprises anchoring means 24 and sealing means 25. The hydraulic cylinder 1 is used to operate the anchoring and sealing means and thereby set and or release the plug 21 in the pipeline 20. The plug may be actively operated by lines from an operation control outside the plug.

In a preferred embodiment comprises the plug 21 as shown in FIG. 2, a first and second endplate, 22 and 23 respectively. There is in this preferred embodiment one hydraulic cylinder operating both anchoring means in form of a first and second wedge part 24, 24', and sealing means 25 in form of a packer. The first wedge 24 of the anchoring means is in abutment against the first endplate 22. The second wedge 24' is between the first wedge 24 and the hydraulic cylinder 1 and in abutment against a packer 25 behind the anchoring means—seen from the first end plate 22. The packer 25 is situated between the second wedge part 24' and the second end plate 23 of the plug. The piston rod 5 is connected to the first end plate 22 and is a through going piston rod 5. The cylinder chamber 6 is situated centrally in the plug 21 with a longitudinal axis mainly corresponding with the longitudinal axis of the pipeline 20. The wedges 24, 24' forming the anchoring means and packer 25 forming the sealing means is situated around the circumference of the hydraulic cylinder, in the annulus between the hydraulic cylinder and the pipeline 20. The second endplate 23 of the plug 21 forms as well one endplate of the cylinder chamber 6, and thereby connecting the cylinder chamber 6 of the hydraulic cylinder to the second endplate 23 of the plug 21. The hydraulic cylinder in this embodiment is pre-stressed with a spring 26 between the cylinder chamber 6 and the first endplate 22 of the plug and will try to retract the plugs anchoring means unless hydraulic fluid is pressurized in the hydraulic cylinder. The hydraulic power unit 8 in this preferred embodiment is situated within the one element forming the piston rod 5 and piston head 4. Batteries for running the motor in the hydraulic power unit 8 may be situates outside the plug 21 and connected to the end of the piston rod 5. In this preferred embodiment includes the hydraulic power unit 8 also remote controlling devices for remote control of the plug, from the outside of the pipeline.

The present invention has now been explained with preferred embodiments, but there are several changes and alterations which a skilled person may envisage within the scope of the invention as defined in the attached claims. The plug may be operated with two or more hydraulic cylinder, the hydraulic cylinder may not have a through going piston rod, the hydraulic cylinder in the plug may not be pre-stressed, and the placement of parts of the hydraulic power unit may be envisaged differently. The plug may be equipped with a lot of other equipment necessary for the use of the plug, as cutting devices, connection devices or other tools.

The invention claimed is:

1. A hydraulic cylinder (1) comprising a cylinder chamber (6), a piston head (4) within said cylinder chamber (6) forming two sub chambers (7, 7') of said cylinder chamber (6) one on each side of the piston head (4), and a piston rod (5) which runs from one side of the piston head (4) through at least one of said sub chambers (7, 7'), wherein a hydraulic power unit (8) for operation of the hydraulic cylinder (1) is situated at least partly within the parts forming at least one of the piston head (4) and the piston rod (5), said hydraulic power unit (8) comprising a motor (10) and a hydraulic pump (11) positioned at least partly within the piston rod (5).

2. Hydraulic cylinder according to claim 1, wherein the piston rod (5) runs through both sub chambers (7, 7').

3. Hydraulic cylinder according to claim 1, wherein at least one of the piston rod (5) and the piston head (4) comprises at least partly one of a remote controlling device comprising a circuit board (13), valves (12), and a pressure transmitter (14).

4. Hydraulic cylinder according to claim 1, wherein the hydraulic cylinder (1) is a two-way operational hydraulic cylinder and the hydraulic pump (11) is a two-way hydraulic pump.

5. Hydraulic cylinder according to claim 1 further comprising a plug (21) having an anchoring means (24) and a sealing means (25) for anchoring and sealing against the internal wall of the pipeline (20), which means are operated by the hydraulic cylinder (1).

6. Hydraulic cylinder according to claim 1, wherein said hydraulic power unit (8) will move with said piston head (4) and said piston rod (5) as said piston head and said piston rod move within said cylinder chamber (6).

* * * * *